(12) United States Patent
Wu et al.

(10) Patent No.: US 8,248,766 B2
(45) Date of Patent: Aug. 21, 2012

(54) TILTING PORTABLE ELECTRONIC DEVICE

(75) Inventors: Kun-Tsan Wu, Shindian (TW); Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 233 days.

(21) Appl. No.: 12/825,471

(22) Filed: Jun. 29, 2010

(65) Prior Publication Data
US 2011/0157786 A1  Jun. 30, 2011

(30) Foreign Application Priority Data
Dec. 31, 2009 (CN) .......................... 2009 1 0312769

(51) Int. Cl.
*G06F 1/16* (2006.01)
(52) U.S. Cl. .................................. 361/679.01
(58) Field of Classification Search ............ 361/679.55, 361/679.01, 679.12; 312/309
See application file for complete search history.

(56) References Cited

U.S. PATENT DOCUMENTS

| | | | | |
|---|---|---|---|---|
| 4,960,256 A * | 10/1990 | Chihara et al. | ............. | 248/286.1 |
| 5,200,913 A * | 4/1993 | Hawkins et al. | ......... | 361/679.09 |
| 6,028,768 A * | 2/2000 | Cipolla | ................... | 361/679.12 |
| 6,219,681 B1 * | 4/2001 | Hawkins et al. | .............. | 708/100 |
| 6,366,935 B2 * | 4/2002 | Hawkins et al. | .............. | 708/100 |
| 6,870,730 B2 * | 3/2005 | Riddiford | ............... | 361/679.34 |
| 6,972,947 B2 * | 12/2005 | Duncan | .................... | 361/679.55 |
| RE39,429 E * | 12/2006 | Hawkins et al. | .............. | 708/100 |
| 7,986,984 B2 * | 7/2011 | Ou | ............................. | 455/575.4 |
| 7,990,694 B2 * | 8/2011 | Goto | ........................ | 361/679.26 |
| 8,018,714 B2 * | 9/2011 | Luke et al. | .............. | 361/679.01 |
| 8,149,581 B2 * | 4/2012 | Ma et al. | ........................ | 361/727 |
| 2008/0174942 A1 * | 7/2008 | Yang et al. | .................... | 361/680 |
| 2011/0051332 A1 * | 3/2011 | Zhang | ...................... | 361/679.01 |
| 2011/0075333 A1 * | 3/2011 | Duan et al. | .............. | 361/679.01 |
| 2011/0096479 A1 * | 4/2011 | Wu et al. | ................. | 361/679.01 |
| 2011/0299235 A1 * | 12/2011 | Liu et al. | ................. | 361/679.09 |

* cited by examiner

*Primary Examiner* — Lisa Lea Edmonds
(74) *Attorney, Agent, or Firm* — Altis Law Group, Inc.

(57) ABSTRACT

A tilting portable electronic device includes a housing, a cover, a swinging member and a sliding member. The swinging member includes at least one arm portion rotatably connecting to the housing and the cover. One end of the sliding member rotatably connects to the cover. The other end of the sliding member slidably connects to the housing. The arm portion rotates to support one end of the cover, the sliding member connects to and slides together with the other end of the cover, causing the cover to open slanted relative to the housing.

13 Claims, 5 Drawing Sheets

TILTING PORTABLE ELECTRONIC DEVICE

CROSS-REFERENCE TO RELATED APPLICATIONS

This application is one of the eight related co-pending U.S. patent applications listed below. All listed applications have the same assignee and were concurrently filed herewith. The disclosure of each of the listed applications is incorporated by reference into all the other listed applications.

| application Ser. No. | Title | Inventors |
| --- | --- | --- |
| 12/825,459 | TILTING PORTABLE ELECTRONIC DEVICE | Kun-Tsan Wu et al. |
| 12/825,462 | TILTING PORTABLE ELECTRONIC DEVICE | Kun-Tsan Wu et al. |
| 12/825,471 | TILTING PORTABLE ELECTRONIC DEVICE | Kun-Tsan Wu et al. |
| 12/825,474 | TILTING PORTABLE ELECTRONIC DEVICE | Kun-Tsan Wu et al. |
| 12/825,477 | TILTING PORTABLE ELECTRONIC DEVICE | Kun-Tsan Wu et al. |
| 12/825,483 | TILTING PORTABLE ELECTRONIC DEVICE | Kun-Tsan Wu et al. |
| 12/825,484 | TILTING PORTABLE ELECTRONIC DEVICE | Kun-Tsan Wu et al. |
| 12/825,488 | TILTING PORTABLE ELECTRONIC DEVICE | Kun-Tsan Wu et al. |

BACKGROUND

1. Technical Field

The present disclosure relates to tilting portable electronic devices.

2. Description of Related Art

Conventional portable electronic device can be classified as bar-type devices, rotating-type devices and sliding-type devices. The bar-type device has a housing secured with a cover. The rotating-type device includes a housing and a cover rotatably attached to the housing about a single axis. The sliding-type device has a housing and a cover slidably attached to the housing.

However, sliding-type electronic devices have the following problems. When a user wants to watch a display of the electronic device resting on a table, it is desirable to have an additional support for supporting the electronic device in a slanted position to give the display a better viewing angle. Alternatively, the user may grip and slope the electronic device with his hands, however, it may become uncomfortable after a long time.

Therefore, there is room for improvement within the art.

BRIEF DESCRIPTION OF THE DRAWINGS

Many aspects of the present tilting portable electronic device can be better understood with reference to the following drawings. The components in the various drawings are not necessarily drawn to scale, the emphasis instead being placed upon clearly illustrating the principles of the present tilting portable electronic device. Moreover, in the drawings, like reference numerals designate corresponding parts throughout the diagrams.

DETAILED DESCRIPTION

Figure 1:
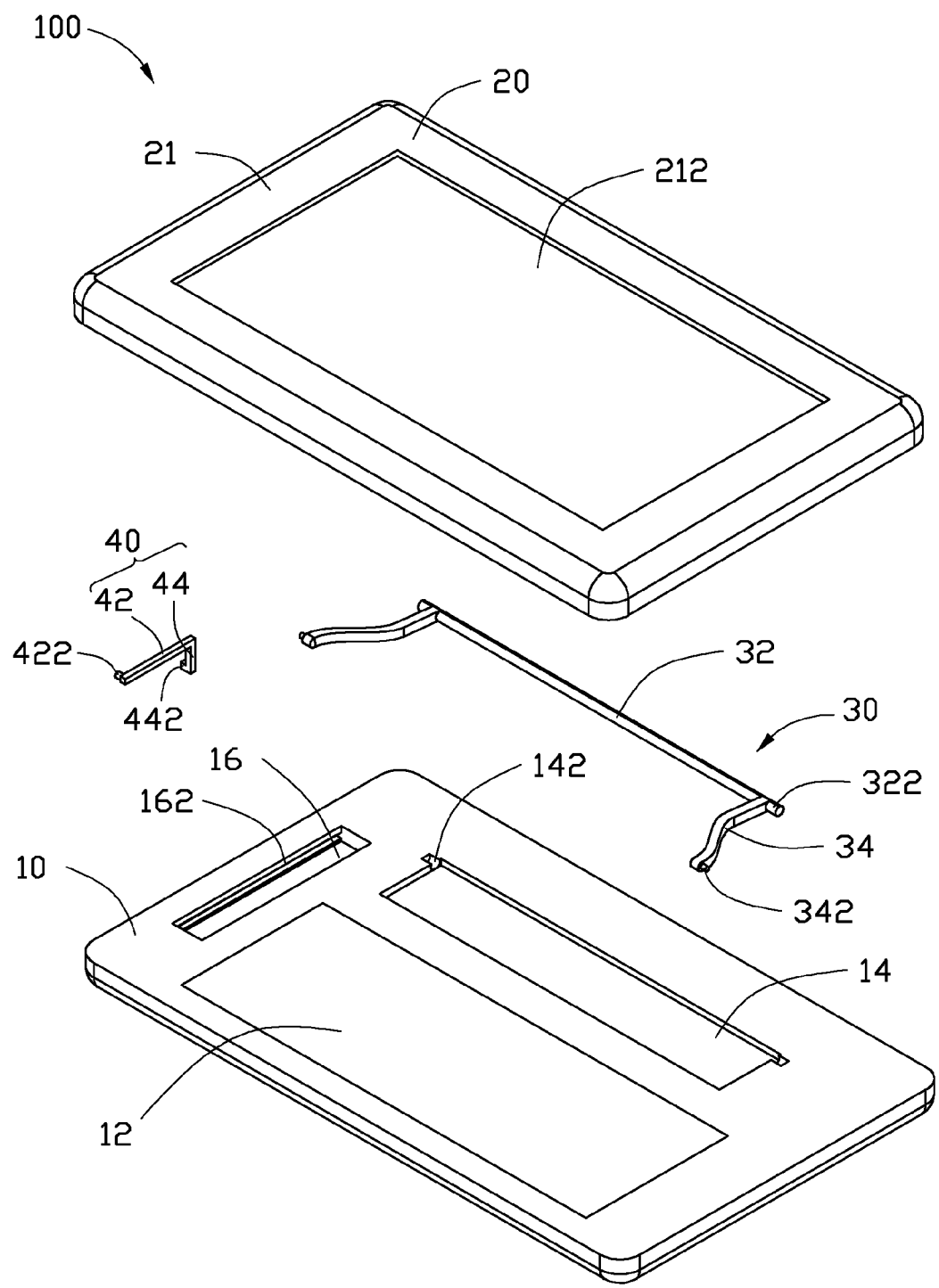
FIG. 1 is an exploded view of a tilting portable electronic device, according to an exemplary embodiment.
Figure 2:
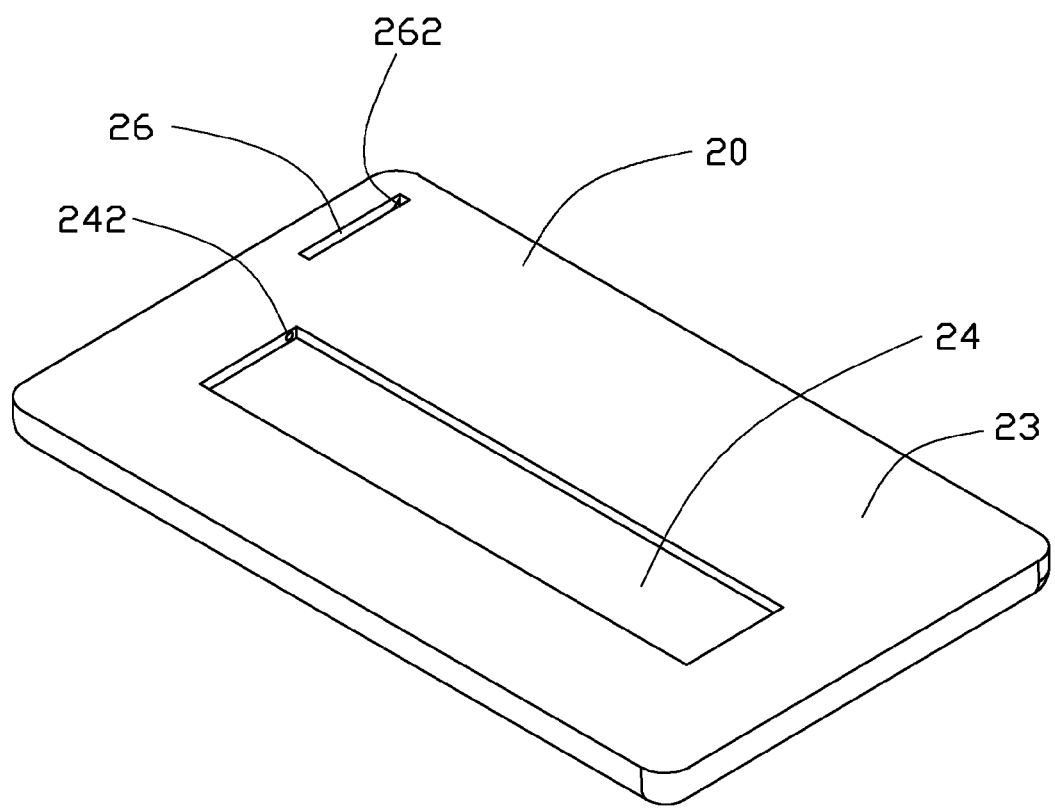
FIG. 2 is an isometric back view of a cover of the electronic device shown in FIG. 1.

FIG. 1 shows a tilting portable electronic device 100, such as mobile phones, personal digital assistants (PDAs), digital cameras, including a housing 10, a cover 20, a swinging member 30, and a sliding member 40. The cover 20 is slidable relative to the housing 10, the swinging member 30 is rotatably connected to the housing 10 and the cover 20, and the sliding member 40 slidably connects the housing 10 and the cover 20. The swinging member 30 and the sliding member 40 cooperatively support one end of the cover 20 in a slanted position relative to the housing 10.

The housing 10 has a top surface 11 having a keypad recess 12, a first assembly groove 14 and a guiding groove 16 defined therein. The keypad recess 12 is adjacent to one end of the top surface 11 and extends along the long side of the housing 10. The keypad recess 12 can mount a keypad therein. The first assembly groove 14 is adjacent to the other long side of the housing and opposite to the keypad recess 12 and extends substantially parallel with the keypad recess 12. The first assembly groove 14 is configured for engaging the swinging member 30. The first assembly groove 14 has spaced-apart first latching holes 142 at opposite sidewalls of the first assembly groove to latch the swinging member 30. The guiding groove 16 is adjacent to and extends along a short side of the top surface 11. The guiding groove 16 defines a slot 162 at an inner sidewall extending along the guiding groove 16 to slidably engage the sliding member 40.

The cover 20 has an upper surface 21 and an opposite lower surface 23. The upper surface 21 has a display 212 formed thereon. The lower surface 23 has a second assembly groove 24 and a connecting groove 26 defined therein. The second assembly groove 24 is substantially parallel with the first assembly groove 14 and engages with the swinging member 30. The second assembly groove 24 defines spaced-apart second latching holes 242 at opposite sidewalls of the second assembly groove 24 to latch the swinging member 30. The connecting groove 26 is located at a corner and extends along the side of the cover 20. The connecting groove 26 defines a fixing hole 262 at an inner sidewall to secure the sliding member 40.

The swinging member 30 includes a bar portion 32 and two arm portions 34. Each arm portions 34 is adjacent to one end of the bar portion 32 and extends laterally from the bar portion 32, accordingly, forming two latching ends 322 at the bar portion 32. Each of the arm portions 34 can be partially received in the first assembly groove 14, the arm portion 34 forming a connecting pin 342 at the distal end, the connecting pin 342 protrudes laterally from the side of each arm portion 34 and engages the second latching hole 242. The latching ends 322 can respectively and rotatably latch into the two first latching holes 142.

The sliding member 40 can be a substantially L-shaped bar. The sliding member 40 includes a first bar section 42 and a second bar section 44 connecting substantially perpendicularly to the first bar section 42. The first bar section 42 forms a connecting shaft 422 at the distal end thereof, the connecting shaft 422 protrudes laterally from the side of the first bar section 42 to engage into the fixing hole 262 of the cover 20. A sliding rib 442 protrudes laterally at the distal end of the second bar section 44. The sliding rib 442 can be inserted into the slot 162 and slide along the slot 162.

Figure 3:
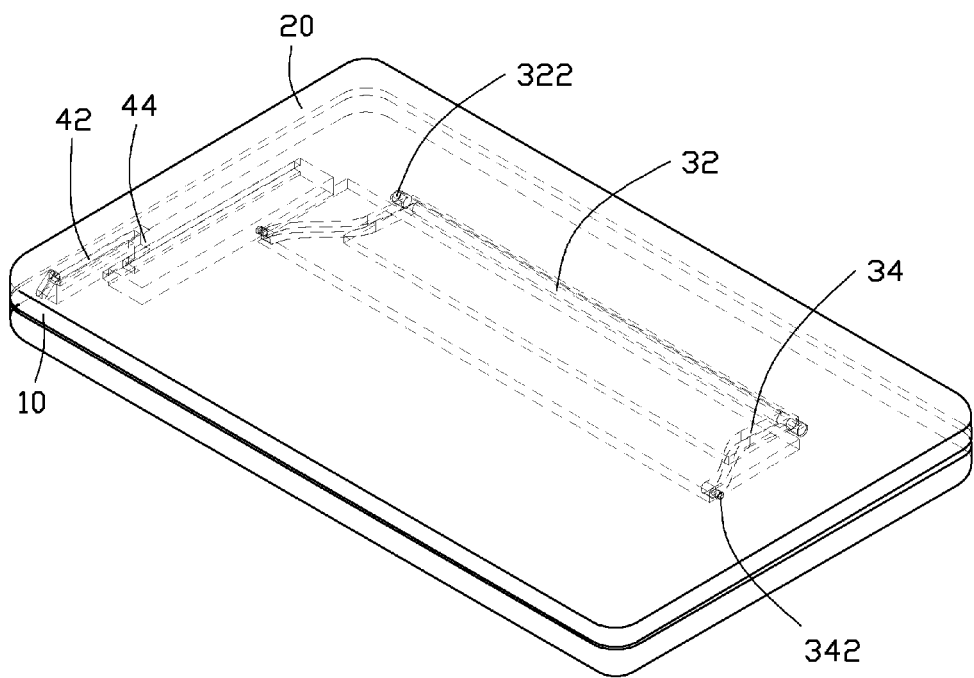
FIG. 3 is a perspective view of the electronic device shown in FIG. 1 with the cover closed.

Referring to FIG. 3, to assemble the tilting portable electronic device 100. The swinging member 30 engages with the first assembly groove 14, by the two latching ends 322 of the bar portion 32 placed into the two first latching holes 142 respectively, the two connecting pins 342 of the arm portions 34 are inserted into the two second latching holes 242 of the second assembly groove 24 respectively. The swinging member 30 can be received in the space enclosed by the first assembly groove 14 and the second assembly groove 24. The sliding member 40 connects the housing 10 and the cover 20. The connecting shaft 422 of the first bar section 42 is inserted into the fixing hole 262 of the cover 20 and is rotatable relative to the fixing hole 262. The sliding rib 442 of the second bar section 44 is inserted into the slot 162 of the guiding groove 16. The sliding member 40 is received in the space enclosing by the guiding groove 16 and the connecting groove 26. Therefore, the tilting portable electronic device 100 is assembled.

Figure 4:
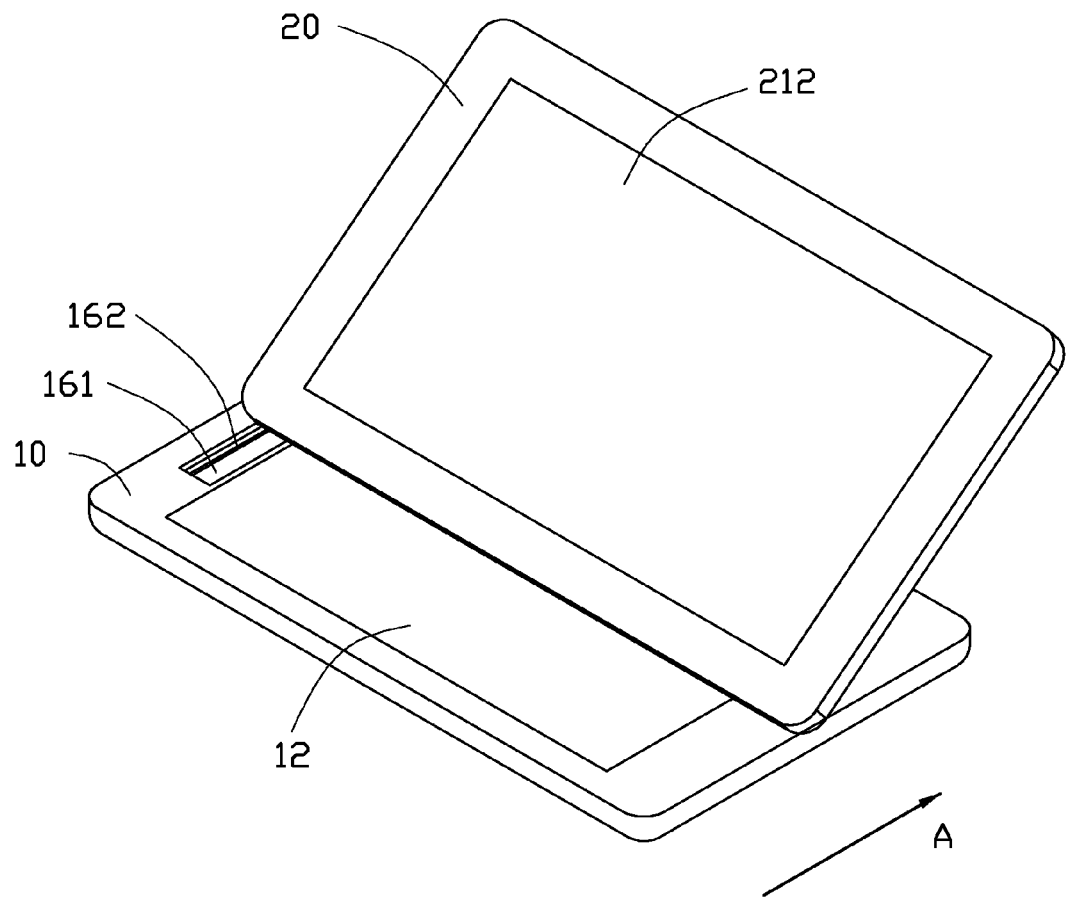
FIG. 4 is a schematic view of the electronic device shown in FIG. 1 with the cover open.
Figure 5:
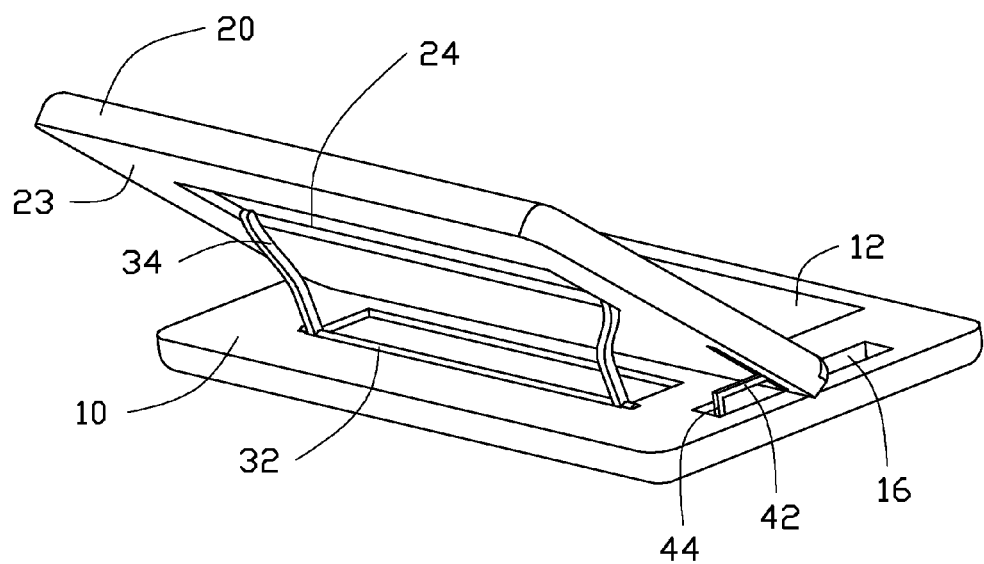
FIG. 5 is a schematic view of the electronic device shown in FIG. 4, but from another view.

Referring to FIGS. 4 and 5, the cover 20 is pushed along the direction shown as arrow A. The arm portions 34 rotate about the bar portion 32 of the swinging member 30, accordingly, the connecting pins 342 rotate in the latching holes 242 and the latching ends 322 rotate in the first latching holes 142. The connecting shaft 422 of the first bar section 42 rotates in the fixing hole 262 of the cover 20, the sliding rib 442 of the second bar section 44 slides along the slot 162 of the guiding groove 16. Thus, the arm portions 34 lift an end of the cover 20, the other end of the cover 20 abuts on the top surface 11 of the housing 10 by connecting of the sliding member 40. Until the sliding rib 442 resists against the end of the slot 162 and can not slide further, the arm portions 34 rotate to a predetermined angle and can not rotate further, and the sliding member 40 and the swinging member 30 are maintained steadily. The cover 20 is opened substantially and slants relative to the housing 10.

To close the cover 20, the end of the cover not abutting the top surface 11 is pressed downward. During this process, the sliding rib 442 slides along the slot 162 and returns to the original position, the arm portions 34 rotate reversely. Accordingly, the cover 20 can be closed easily.

It is noteworthy that, the swinging member 30 can be a single arm portion 34 with two ends of the arm portion 34 rotatably connecting to the cover 20 and the housing 10 respectively.

It is noteworthy that, the sliding member 40 can be a straight bar with one end of the bar connected slidably to the slot 162 of the housing 10 and the other end of the bar rotatably connected to the fixing hole 262 of the cover 20.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A tilting portable electronic device, comprising:
    a housing defining a first assembly groove;
    a cover defining a second assembly groove;
    a swinging member including at least one arm portion, the arm portion rotatably connecting the housing and the cover, one end of the arm portion rotatably extending into the first assembly groove and the other end of the arm portion rotatably extending into the second assembly groove; and
    a sliding member with one end rotatably connecting the cover, the other end slidably connecting with the housing;
    wherein when the cover is opened relative to the housing, the arm portion rotates to support one end of the cover, and the sliding member slides together with the other end of the cover, the cover opens slantingly relative to the housing.

2. The tilting portable electronic device as claimed in claim 1, wherein the swinging member includes a bar portion and two arm portions laterally extending from the bar portion, correspondingly form two latching ends, the first assembly groove has two first latching holes defined at two ends, the two first latching holes respectively receive the two latching ends therein.

3. The tilting portable electronic device as claimed in claim 2, wherein each arm portion forms a connecting pin at the distal end, the second assembly groove defines two spaced-apart second latching holes at opposite sidewalls of the second assembly groove correspondingly to receive the two connecting pins therein.

4. The tilting portable electronic device as claimed in claim 2, wherein the housing defines a guiding groove, one end of the sliding member extends into and slides along the guiding groove.

5. The tilting portable electronic device as claimed in claim 4, wherein the guiding groove has a slot defined at a sidewall, the sliding member forms a sliding rib at one end to engage into the slot, the sliding rib slides along the slot.

6. The tilting portable electronic device as claimed in claim 5, wherein the cover defines a connecting groove, the connecting groove defines a fixing hole at a sidewall thereof, the sliding member forms a connecting shaft at the other end to engage into the fixing hole, the connecting shaft is rotatable in the fixing hole.

7. The tilting portable electronic device as claimed in claim 6, wherein the sliding member is an L-shaped bar and includes a first bar section and a second bar section perpendicularly connecting to the first bar section, the first bar section forms the connecting shaft at one distal end, the second bar section forms the sliding rib at a second distal end.

8. The tilting portable electronic device as claimed in claim 1, wherein the housing has a top surface defining a keypad area, the cover has an upper surface having a display, when the cover is opened, the display is slanted relative to the keypad area.

9. A tilting portable electronic device, comprising:
    a housing having a top surface, the top surface having a keypad formed thereon;
    a cover having an upper surface forming a display;
    at least one arm portion rotatably connecting the housing and the cover;
    a sliding member with one end rotatably connecting the cover and the other end slidably connecting with the housing;
    wherein the housing defines a guiding groove, the guiding groove has a slot defined at a sidewall, the sliding member forms a sliding rib at one end to engage into the slot, and the sliding rib slides along the slot;
    wherein when the cover is opened, the arm portion rotates to support one end of the cover, and the sliding member connects to and slides together with the other end of the cover, causing the cover to open slanted relative to the housing.

10. The tilting portable electronic device as claimed in claim 9, wherein the top surface defines a first assembly groove, the cover has a lower surface opposite to the upper surface, the lower surface has a second assembly groove defined therein, one end of each arm portion rotatably extends into the first assembly groove, the other end of each arm portion rotatably extends into the second assembly groove.

11. The tilting portable electronic device as claimed in claim 10, wherein the portable electronic device includes a swinging member, the swinging member includes a bar portion and said the arm portions laterally extending from each end of the bar portion, and forming two latching ends at the bar portion, the first assembly groove has spaced-apart first latching holes defined at opposite sidewalls of the first assembly groove to receive the two latching ends therein.

12. The tilting portable electronic device as claimed in claim 11, wherein each arm portion forms a connecting pin at one distal end, the second assembly groove has defines two spaced-apart second latching holes at opposite sidewalls of the second assembly groove to respectively receive the two connecting pins.

13. The tilting portable electronic device as claimed in claim 9, wherein the cover defines a connecting groove having a fixing hole at a sidewall thereof, the sliding member forms a connecting shaft at the other end to engage into the fixing hole, the connecting shaft is rotatable in the fixing hole.

* * * * *